(12) United States Patent
Jourdan et al.

(10) Patent No.: US 7,802,077 B1
(45) Date of Patent: Sep. 21, 2010

(54) TRACE INDEXING VIA TRACE END ADDRESSES

(75) Inventors: Stephen J. Jourdan, Portland, OR (US); Lihu Rappoport, Haifa (IL); Ronny Ronen, Haifa (IL); Adi Yoaz, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 2187 days.

(21) Appl. No.: 09/608,624

(22) Filed: Jun. 30, 2000

(51) Int. Cl.
G06F 9/30 (2006.01)
G06F 9/40 (2006.01)
G06F 15/00 (2006.01)

(52) U.S. Cl. .................. 712/207; 712/219; 712/227; 711/118; 711/123; 711/128; 711/137; 711/140; 717/153; 717/128; 717/129

(58) Field of Classification Search ........... 712/219, 712/207, 227, 233–240; 711/118, 123, 128, 711/137, 140, 149, 213; 717/128–129, 153–159
See application file for complete search history.

(56) References Cited

U.S. PATENT DOCUMENTS

| | | | | |
|---|---|---|---|---|
| 4,575,814 A | * | 3/1986 | Brooks et al. | 711/217 |
| 4,909,727 A | * | 3/1990 | Khinkis | 431/10 |
| 5,381,533 A | | 1/1995 | Peleg et al. | |
| 5,461,699 A | * | 10/1995 | Arbabi et al. | 706/21 |
| 5,492,276 A | * | 2/1996 | Kaylor | 239/428 |
| 5,889,999 A | * | 3/1999 | Breternitz et al. | 717/158 |
| 5,913,223 A | | 6/1999 | Sheppard et al. | |
| 5,924,092 A | | 7/1999 | Johnson | |
| 5,966,541 A | * | 10/1999 | Agarwal | 717/132 |
| 5,974,538 A | * | 10/1999 | Wilmot, II | 712/218 |
| 6,073,213 A | | 6/2000 | Peled | |
| 6,076,144 A | * | 6/2000 | Peled et al. | 711/125 |
| 6,185,675 B1 | * | 2/2001 | Kranich et al. | 712/238 |
| 6,189,140 B1 | * | 2/2001 | Madduri | 717/128 |
| 6,216,200 B1 | * | 4/2001 | Yeager | 711/100 |
| 6,233,678 B1 | * | 5/2001 | Bala | 712/240 |
| 6,279,103 B1 | * | 8/2001 | Warren | 712/227 |
| 6,339,822 B1 | | 1/2002 | Miller | |
| 6,351,844 B1 | | 2/2002 | Bala | |
| 6,427,188 B1 | | 7/2002 | Lyon et al. | |
| 6,507,921 B1 | * | 1/2003 | Buser et al. | 714/45 |
| 6,535,959 B1 | | 3/2003 | Ramprasad et al. | |
| 2002/0078327 A1 | | 6/2002 | Jourdan et al. | |

OTHER PUBLICATIONS

Black et al., "The Block-base Trace Cache", ACM SIGARCH Computer Architecture News, Proceedings of the 26th annual international symposium on computer architecture, May 1999.*

(Continued)

Primary Examiner—Christopher B Shin
Assistant Examiner—Jesse R Moll
(74) Attorney, Agent, or Firm—Kenyon & Kenyon LLP

(57) ABSTRACT

A new class traces for a processing engine, called "extended blocks," possess an architecture that permits possible many entry points but only a single exit point. These extended blocks may be indexed based upon the address of the last instruction therein. Use of the new trace architecture provides several advantages, including reduction of instruction redundancies, dynamic block extension and a sharing of instructions among various extended blocks.

15 Claims, 3 Drawing Sheets

OTHER PUBLICATIONS

Patel et al., "Improving Trace Cache Effectiveness with Branch Promotion and Trace Packing", ACM SIGARCH Computer Architecture News, Proceedings of the 25th annual international symposium on computer architecture, Apr. 1998.*

Frienfly et al., "Alternative Fetch and Issue Policies for the Trace Cache Fetch Mechanism", Proceedings of the 30th annual ACM/IEEE international symposium on Microarchitecture, Dec. 1997.*

Microsoft Computer Dictionary, 2002, Microsoft Press, 5th edition, pp. 148, 195, 210, 473, and 525.*

Nair Ravi, "Trace Caches and Trace Processors", lecture note, pp. 1-2, USPTO training for examiners in the computer architecture area, Apr. 29, 2004.*

Alexander Stepanov and Meng Lee, The Standard Template Library, Oct. 31, 1995.*

Stephan Jourdan, Lihu Rappoport, Yoav Almog, Mattan Erez, Adi Yoaz, and Ronny Ronen, "eXtended Block Cache", Proceedings of Int'l. Symposium on High Performance Computer Architecture, Jan. 2000.*

Mantripragada et al., "A New Framework for Integrated Global Local Scheduling", 1998.*

Mahlke et al., "Effective Compiler Support for Predicated Execution Using the Hyperblock", 1992.*

Black et al, "The Block-Based Trace Cache", Proceedings of the $26^{th}$ Int'l. Symposium on Computer Architecture, May 2-4, 1999, Atlanta, Georgia.

Conte et al, "Optimization of Instruction Fetch Mechanisms for High Issue Rates", Proceedings of the $22^{nd}$ Annual Int'l. Symposium on Computer Architecture, Jun. 22-24, 1995, Santa Margherita Ligure, Italy.

Dutta et al, "Control Flow Prediction with Tree-Like Subgraphs for Superscalar Processors", Proceedings of the $28^{th}$ Int'l. Symposium on Microarchitecture, Nov. 29-Dec. 1, 1995, Ann Arbor, Michigan.

Friendly et al, "Alternative Fetch and Issue Policies for the Trace Cache Fetch Mechanism", Proceedings of the $30^{th}$ Annual IEEE/ACM Int'l. Symposium on Microarchitecture, Dec.1-3, 1997, Research Triangle Park, North Carolina.

Intrater et al, "Performance Evaluation of a Decoded Instruction Cache for Variable Instruction-Length Computers", Proceedings of the $19^{th}$ Annual Int'l. Symposium on Computer Architecture, May 19-21, 1992, Gold Coast, Australia.

Jacobson et al, "Path-Based Next Trace Prediction", Proceedings of the $30^{th}$ Annual Int'l. Symposium on Microarchitecture, Dec. 1-3, 1997, Research Triangle Park, North Carolina.

McFarling, Scott, "Combining Branch Predictors", Jun. 1993, WRL Technical Note TN-36, Digital Western Research Laboratory, Palo Alto, California.

Michaud et al, "Exploring Instruction-Fetch Bandwidth Requirement in Wide-Issue Superscalar Processors", Proceedings of The 1999 Int'l. Conference on Parallel Architectures and Compilation Techniques, Oct. 12-16, 1999, Newport Beach, California.

Patel et al, "Improving Trace Cache Effectiveness with Branch Promotion and Trace Packing", Proceedings of The $25^{th}$ Annual Int'l. Symposium on Computer Architecture, Jun. 27-Jul. 1, 1998, Barcelona, Spain.

Reinman et al, "A Scalable Front-End Architecture for Fast Instruction Delivery", Proceedings of The $26^{th}$ Int'l. Symposium on Computer Architecture, May 2-4, 1999, Atlanta, Georgia.

Rotenberg et al, "Trace Cache: A Low Latency Approach to High Bandwidth Instruction Fetching", Proceedings of the $29^{th}$ Annual IEEE/ACM Int'l. Symposium on Microarchitecture, MICRO-29, Dec. 2-4, 1996, Paris, France.

Seznec et al, "Multiple-Block Ahead Branch Predictors", Proceedings of The $7^{th}$ Int'l. Conference on Architectural Support for Programming Languages and Operating Systems, Oct. 1-4, 1996, Cambridge, United States.

Yeh et al, "Increasing the Instruction Fetch Rate via Multiple Branch Prediction and a Branch Address Cache", Proceedings of The $7^{th}$ Int'l. Conference on Supercomputing, Jul. 1993.

Jourdan et al, "eXtended Block Cache", Intel Corporation, Intel Israel, Haifa, 31015, Israel, pp. 1-10.

Johnson, Mike, *Superscalar Microprocessor Design*, Chapter 10, pp. 177-202, PTR Prentice-Hall, Englewood Cliffs, New Jersey, 1991.

Jourdan et al, "Extended Block Cache", Proceedings of the Sixth International Symposium on High-Performance Computer Architecture, Toulouse, France, Jan. 8-12, 2000.

Hennessey & Patterson, *Computer Organization and Design*, 2nd Edition, p. 570, 1998.

Rotenbery et al, "Trace Processors", Proceedings of 30th Annual IEEE/ACM International Symposium on Microarchitecture, pp. 138-148, Dec. 1, 1997.

Bellas et al., "Architectural and Compiler Techniques for Energy Reduction in High Performance Microprocessors," *IEEE Transactions on VLSI*, vol. 8, No. 3, Jun. 2000, pp. 317-326.

Glaskowsky, Peter N., "Pentium 4 (Partially) Previewed," *Microprocessor Report*, vol. 14, Archive 8, Aug. 2000, p. 1, pp. 11-13.

Manne et al., "Pipeline Gating: Speculation Control for Energy Reduction," *ACM SIGARCH, Proceedings of the $25^{th}$ Annual International Symposium on Computer Architecture*, IEEE Computer Society Tech. Comm. on Computer Architecture, Jun. 27-Jul. 1, 1998, Barcelona, Spain, pp. 132-141.

Papworth, David B., "Tuning the Pentium Pro Microarchitecture," *IEEE Micro*, IEEE Computer Society, vol. 16, No. 2, Apr. 1996, pp. 8-15.

Solomon et al., "Micro-Operation Cache: A Power Aware Frontend for Variable Instruction Length ISA," *ISLPED '01*, Aug. 6-7, 2001, Huntington Beach, CA, pp. 4-9.

Upton, Michael, "The Intel Pentium® 4 Processor," http://www.intel.com/pentium4, Oct. 2000, 15 pp.

* cited by examiner

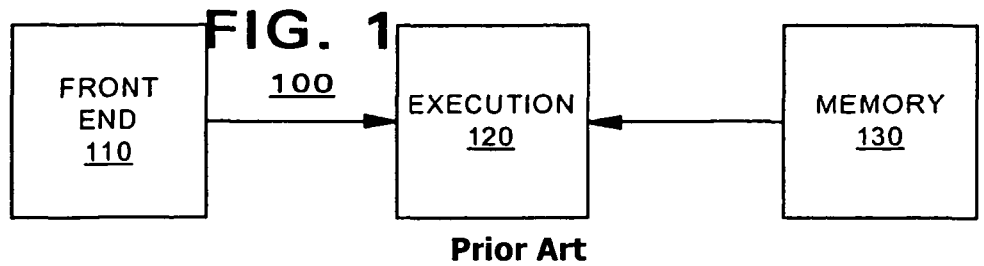
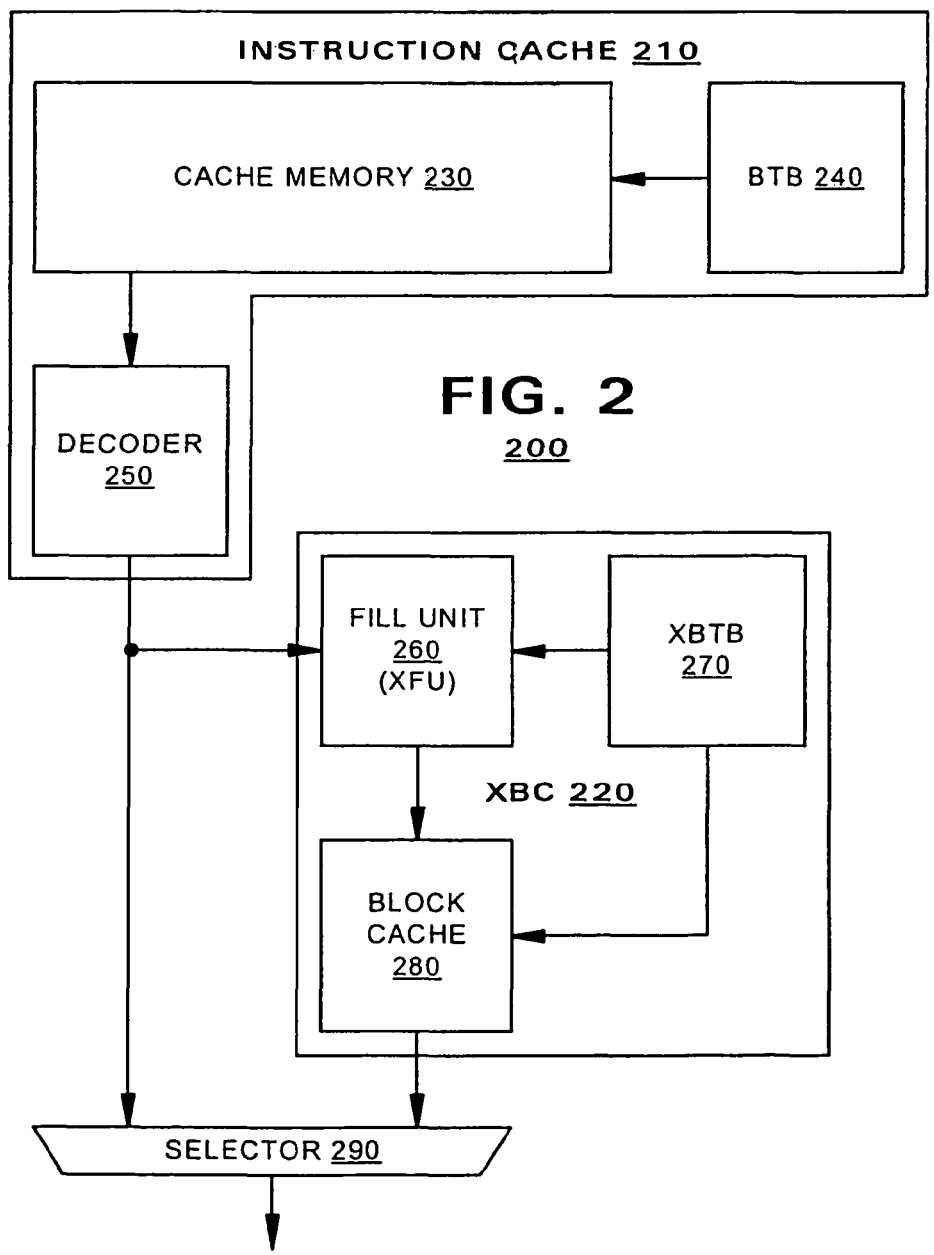

1000

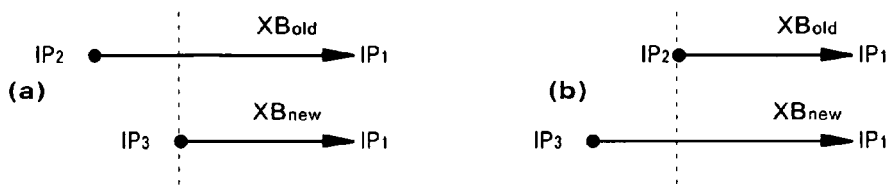
FIG. 4
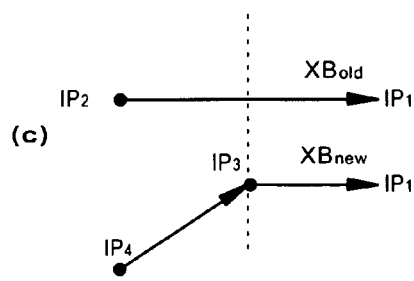
FIG. 5
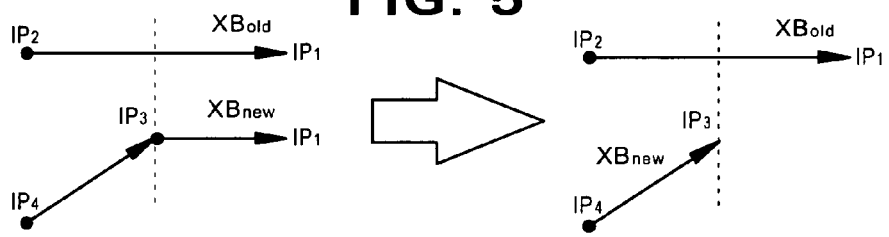
FIG. 6
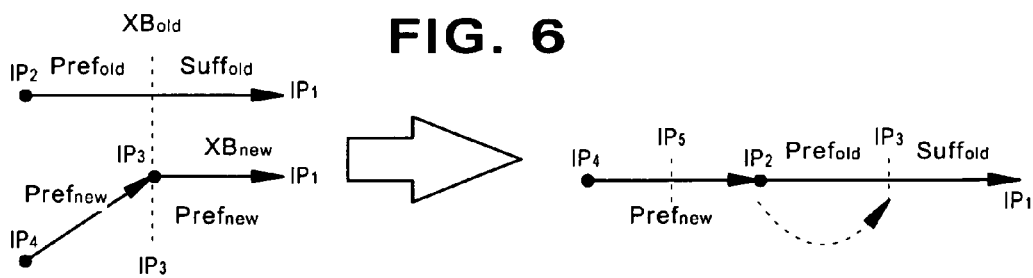

TRACE INDEXING VIA TRACE END ADDRESSES

BACKGROUND

The present invention provides a new trace assembly paradigm for processing circuits.

FIG. 1 is a block diagram illustrating the process of program execution in a conventional processor. Program execution may include three stages: front end 110, execution 120 and memory 130. The front-end stage 110 performs instruction pre-processing. Front end processing is designed with the goal of supplying valid decoded instructions to an execution core with low latency and high bandwidth. Front-end processing can include instruction prediction, decoding and renaming.

As the name implies, the execution stage 120 performs instruction execution. The execution stage 120 typically communicates with a memory 130 to operate upon data stored therein.

The front end stage 110 may include a trace cache (not shown) to reduce the latency of instruction decoding and to increase front end bandwidth. A trace cache is a circuit that assembles sequences of dynamically executed instructions into logical units called "traces." The program instructions may have been assembled into a trace from non-contiguous regions of an external memory space but, when they are assembled in a trace, the instructions appear in program order. Typically, a trace may begin with an instruction of any type. The trace may end when one of number of predetermined trace end conditions occurs, such as a trace size limit, a maximum number of conditional branches occurs or an indirect branch or return instruction occurs.

Prior art traces are defined by an architecture having a single entry point but possibly many exit points. This architecture, however, causes traces to exhibit instruction redundancy. Consider, by way of example, the following code sequence:

If (cond)
A
B

This simple code sequence produces two possible traces: 1) B and 2) AB. When assembled in a trace cache, each trace may be stored independently of the other. Thus, the B instruction would be stored twice in the trace cache. This redundancy lowers system performance. Further, because traces may start on any instruction, the B instruction also may be recorded in multiple traces due to instruction alignment discrepancies that may occur. This instruction redundancy limits the bandwidth of front-end processing.

Accordingly, there is a need in the art for a front-end stage that reduces instruction redundancy in traces.

BRIEF DESCRIPTION OF THE DRAWINGS

FIG. 1 is a block diagram illustrating functional processing in program execution.

FIG. 2 is a block diagram of a front-end stage 200 according to an embodiment of the present invention.

FIGS. 4(a)-4(c) illustrate construction of extended blocks according to embodiments of the present invention.

FIG. 5 illustrates construction of an extended block according to an embodiment of the present invention.

FIG. 6 illustrates construction of a complex extended block according to a embodiment of the present invention.

DETAILED DESCRIPTION

Figure 3:
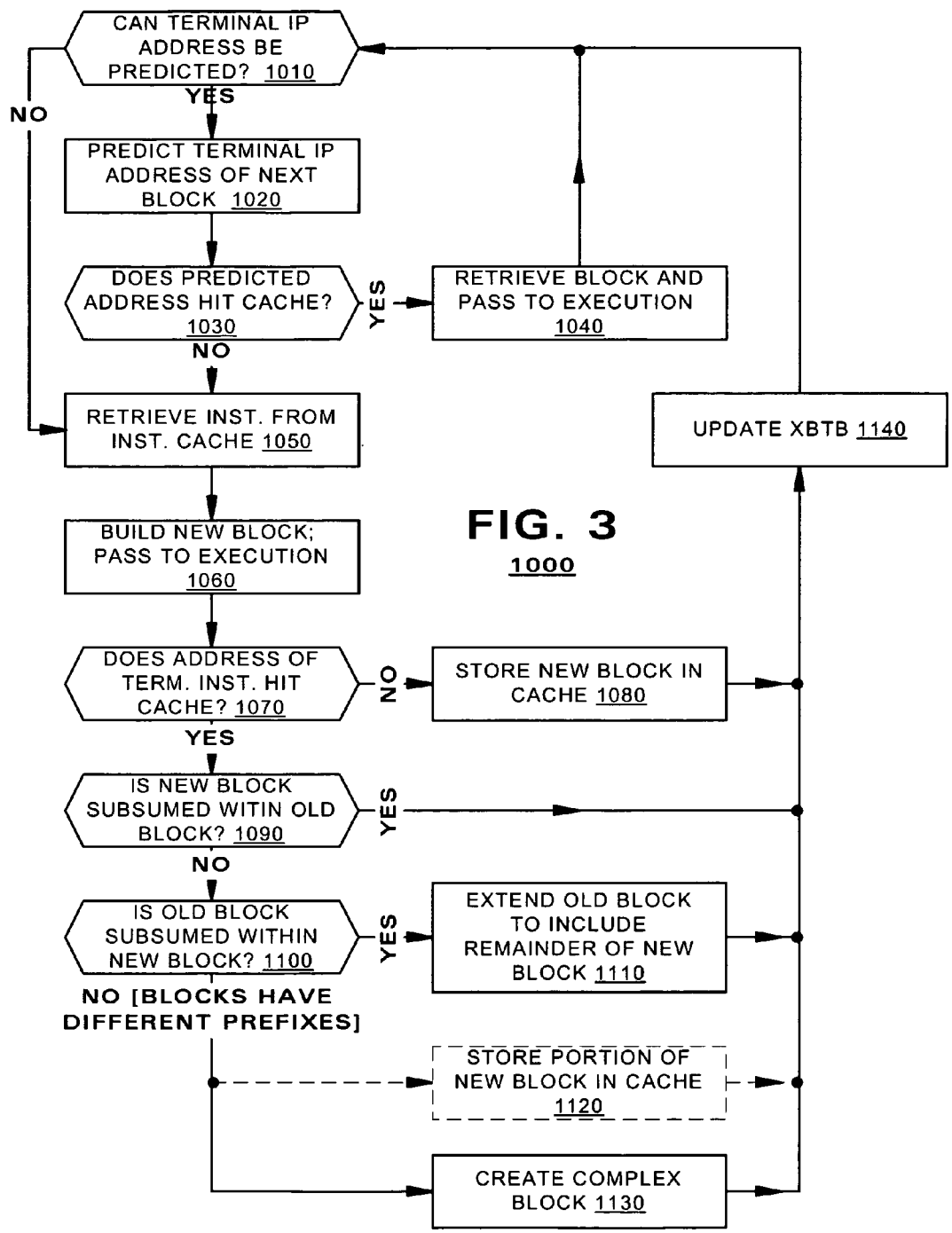
FIG. 3 is a flow diagram illustration operation 1000 of the XFU 260 according to an embodiment of the invention.

Embodiments of the present invention assemble a new type of traces, called "extended blocks" herein, according to an architecture that permits several entry points but only a single exit point. These extended blocks may be indexed based upon the address of the last instruction therein. The extended block architecture provides several advantages over prior architectures:

instruction redundancies can be eliminated, multiple entry points are permitted, extended blocks may be extended dynamically, and basic blocks may be shared among various extended blocks.

FIG. 2 is a block diagram of a front-end stage 200 according to an embodiment of the present invention. The front end 200 may include an instruction cache 210 and an extended block cache ("XBC") 220. The instruction cache 210 may be based on any number of known architectures for front-end systems. Typically, they include an instruction memory 230, a branch predictor 240 and an instruction decoder 250. Program instructions may be stored in the cache memory 230 and indexed by an instruction pointer. Instructions may be retrieved from the cache memory 230, decoded by the instruction decoder 250 and passed to the execution unit (not shown). The branch predictor 240 may assist in the selection of instructions to be retrieved from the cache memory 230 for execution. As is known, instructions may be indexed by an address, called an "instruction pointer" or "IP."

According to an embodiment, an XBC 220 may include a fill unit ("XFU") 260, a block predictor ("XBTB") 270 and a block cache 280. The XFU 260 may build the extended blocks. The block cache 280 may store the extended blocks. The XBTB 270 may predict which extended blocks, if any, are likely to be executed and may cause the block cache to furnish any predicted blocks to the execution unit. The XBTB 270 may store masks associated with each of the extended blocks stored by the block cache 280, indexed by the IP of the terminal instruction of the extended blocks.

The XBC 220 may receive decoded instructions from the instruction cache 210. The XBC 220 also may pass decoded instructions to the execution unit (not shown). A selector 290 may select which front-end source, either the instruction cache 210 or the XBC 220, will supply instructions to the execution unit. In an embodiment, the block cache 280 may control the selector 290.

As discussed, the block cache 280 may be a memory that stores extended blocks. According to an embodiment, the extended blocks may be multiple-entry, single-exit traces. An extended block may include a sequence of program instructions. It may terminate in a conditional branch, an indirect branch or based upon a predetermined termination condition such as a size limit. Again, the block cache 280 may index the extended blocks based upon an IP of the terminal instruction in the block.

Extended blocks are useful because, whenever program flow enters the extended block, the flow necessarily progresses to the terminal instruction in the extended block. An extended block may contain any conditional or indirect branches only as a terminal instruction. Thus, the extended block may have multiple entry points. According to an embodiment, an unconditional branch need not terminate an extended block.

According to an embodiment, a hit/miss indication from the block cache 280 may control the selector 290.

FIG. 3 is a flow diagram illustrating operation 1000 of the XBC 220 according to an embodiment of the invention. Operation may begin when the XBC 220 determines whether an IP of a terminal instruction from an extended block may be predicted (Stage 1010). If so, the XBC 200 performs such a prediction (Stage 1020). The prediction may be made by the XBTB 220. Based on the IP of the predicted terminal instruction, the block cache 280 may indicate a "hit" or a "miss" (Stage 1030). A hit indicates that the block cache 280 stores an extended block that terminates at the predicted IP. In this case, the XFU 260 may cause an extended block to be retrieved from the block cache 280 and forwarded to the execution units (Stage 1040). Thereafter, the process may return to Stage 1010 and repeat.

If the predicted IP does not hit the block cache 280 or if an IP of a terminal instruction could not be predicted at Stage 1010, the XFU 260 may build a new extended block. Decoded instructions from the instruction cache may be forwarded to the execution unit (Stage 1050). The XFU 260 also may receive the retrieved instructions from the instruction cache system 210. It stores instructions in a new block until it reaches a terminal condition, such as a conditional or implicit branch or a size limitation (Stage 1060). Having assembled a new block, the XFU 260 may determine how to store it in the block cache 280.

The XFU 260 may determine whether the terminal IP of the new block hits the block cache (Stage 1070). If not, then the XFU 260 simply may cause the new block to be stored in the block cache 280 (Stage 1080).

If the IP hits the block cache, then the XFU 260 may compare the contents of the new block with the contents of an older block stored in the block cache that generated the hit. The XFU 260 may determine whether the contents of the new block are subsumed entirely within the old block (Stage 1090). If so, the XFU 260 need not store the new block in the block cache 280 because it is present already in the old block. If not, the XFU 260 may determine whether the contents of the old block are subsumed within the new block (Stage 1100). If so, the XFU 260 may write the new block over the old block in the cache (Stage 1110). This has the effect of extending the old block to include the new block.

If neither of the above conditions is met, then the new block and the old block may be only partially co-extensive. There are several alternatives for this case. In a first embodiment, the XFU 260 may store the non-overlapping portion of the new block in the block cache 280 as a separate extended block (Stage 1120). Alternatively, the XFU 260 may create a complex extended block from the new block and the old block (Stage 1130). These are discussed in greater detail below.

Once the new block is stored in the block cache 280, at the conclusion of Stages 1110, 1120 or 1130, the XBTB may be updated to reflect the contents of the block cache 280 (Stage 1140). Thereafter, operation may return to Stage 1010 for a subsequent iteration.

FIGS. 4(a)-4(c) schematically illustrate the different scenarios that may occur if the IP pointer of the new extended block $XB_{new}$ matches that of an extended block stored previously within the block cache 280 ($XB_{old}$). In FIG. 4(a), the older extended block $XB_{old}$ is co-extensive with the new extended block $XB_{new}$ but is longer. In this case, the new extended block $XB_{new}$ should not be stored separately within the block cache 280; the older extended block may be used instead. In FIG. 4(b), the older extended block $XB_{old}$ is co-extensive with a portion of the new extended $XB_{new}$ but $XB_{new}$ is longer. In this case, the older extended block may be extended to include the additional instructions found in $XB_{new}$.

In a third case, shown in FIG. 4(c), only a portion of $XB_{new}$ and $XB_{old}$ are co-extensive. In this case, a "suffix" of each extended block coincides but the two extended blocks have different "prefixes." In a first embodiment, the XFU 260 may store a prefix of the new extended block as an extended block all its own. The prefix may end in an unconditional jump pointing to an appropriate location in the older extended block. This solution is shown in FIG. 5.

Alternatively, the XFU 260 may assemble a single, complex extended block merging the two extended blocks. In this embodiment, the XFU 260 may extend the older extended block by adding the prefix of the new extended block to a head of the older extended block. The prefix of the new extended block may conclude in an unconditional jump pointing to the common suffix. This solution is shown in FIG. 6. This embodiment creates a single, longer extended block instead of two short extended blocks and thereby contributes to increased bandwidth. In such an embodiment, the XFU 260 may generate a mask in the block cache 280 that is associated with the complex extended block.

According to an embodiment, the XBTB 270 may predict extended blocks to be used.

Returning to FIG. 2, the XBTB 270 may predict extended blocks for use during program execution. The XBTB 270 may store information for each of the extended blocks stored in the block cache 280. In an embodiment, the XBTB 270 may store masks for each block cache. These masks may identify whether a corresponding extended block is a complex or non-complex block (compare FIGS. 4(a) and 4(b) with FIG. 6). For non-complex extended blocks, the XBTB 270 may store a mask identifying the length of the extended blocks. For complex extended blocks, the XBTB 270 may store a mask that distinguishes multiple prefixes from each other. Thus, while the prefixes may be linearly appended to each other as shown in FIG. 6, a mask as stored in the XBTB permits the XBTB to determine the position of an entry point to an extended block based on an instruction's IP.

As described above, an XBTB 270 may store a mapping among blocks. As noted, the XBTB 270 may identify the terminal IP of each block and may store masks for each extended block. The XBTB 270 also may store a mapping identifying links from one XBTB to another. For example, if a first extended block ended in a conditional branch, program execution may reach a second extended block by following one of the directions of the terminal branch and execution may reach a third extended block by following the other direction. The XBTB 270 may store a mapping of both blocks. In this embodiment, the XFU 260 may interrogate the XBTB 270 with an IP. By way of response, the XBC 220 may respond with a hit or miss indication and, if the response is a hit, may identify one or more extended blocks in the block cache to which the IP may refer. In this embodiment, the XBC 220 may determine whether a terminal IP may be predicted and whether the predicted address hits the cache (Stages 1010, 1030).

According to an embodiment, XBC bandwidth may be improved by using conditional branch promotion for terminal instructions. As is known, conditional branch promotion permits a conditional branch to be treated as an unconditional branch if it is found that the branch is nearly monotonic. For example, if during operation, it is determined that program execution at a particular branch tends to follow one of the branches 99% of the time, the branch may be treated as an unconditional jump. In this case, two extended blocks may be joined as a single extended block. This embodiment further contributes to XBC bandwidth.

According to another embodiment, XBC latency may be minimized by having the block cache 280 store extended block instructions in decoded form. Thus, the instructions may be stored as microinstructions (commonly, "uops").

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A front-end system for a processor, comprising:
   an instruction cache system;
   an extended block cache system, comprising:
      a fill unit coupled to the instruction cache system,
      a block cache,
      a block predictor to store masks associated with complex blocks, the masks distinguishing block prefixes from each other; and
      a selector coupled to the output of the instruction cache system and to an output of the block cache.

2. The front-end system of claim 1, wherein the extended block cache system further comprises a block predictor coupled to the fill unit and the block cache.

3. The front-end system of claim 1, wherein the block cache is to store blocks having a multiple-entry, single exit architecture.

4. The front-end system of claim 1, wherein the block cache is to store complex blocks having multiple independent prefixes and a common suffix.

5. A method of managing extended blocks, comprising:
   predicting an address of a terminal instruction of an extended block to be used,
   determining whether the predicted address matches an address of a terminal instruction of a previously created extended block, and
   selecting one of the extended block in the event of a match.

6. The method of claim 5, further comprising creating a new extended block when there is no match.

7. The method of claim 6, wherein the creating comprises:
   receiving new instructions until a terminal condition occurs,
   assembling the new instructions into an extended block,
   determining whether an address of a terminal instruction in the new block matches an address of a terminal instruction of a pre-existing block, and
   unless a match occurs, storing the new block in a memory.

8. The method of claim 7, wherein the storing comprises, when an older block causes a match, storing the new block over the old block in a memory if the old block is subsumed within the new block.

9. The method of claim 7, wherein the storing comprises, when an older block causes a match, dropping the new block if the new block is subsumed within the older block.

10. The method of claim 7, wherein the storing comprises, when an older block causes a match, creating a complex block if the new block and the older block share a common suffix but include different prefixes.

11. The method of claim 5, further comprising outputting instructions of the selected extended block for execution.

12. A processing engine, comprising:
   a front end stage storing blocks of instructions in a multiple-entry, single exit architecture when considered according to program flow, and
   an execution unit in communication with the front end stage,
   wherein the front-end stage includes
   an instruction cache system,
   an extended block cache system, including
      a fill unit provided in communication with the instruction cache system,
      a block cache, and
      a selector coupled to the output of the instruction cache system and to an output of the block cache.

13. The processing engine of claim 12, wherein the block cache is to store the multiple-entry, single exit traces.

14. The processing engine of claim 12, wherein the extended block cache system further comprises a block predictor coupled to the fill unit and the block cache.

15. A memory comprising storage for a plurality of traces and means for indexing the traces by an address of a last instruction therein according to program flow, wherein the traces include a plurality of instructions assembled according to program flow and at least one trace includes at least three segments of executable instructions in which, when considered according to program flow, first and second segments are mutually exclusive of each other and lead into the third segment.

* * * * *